(12) United States Patent
Rolson

(10) Patent No.: US 12,151,651 B2
(45) Date of Patent: Nov. 26, 2024

(54) TRAILER MOUNTABLE PORTABLE LADDER ASSEMBLY

(71) Applicant: Robert Gregg Rolson, Foxboro, WI (US)

(72) Inventor: Robert Gregg Rolson, Foxboro, WI (US)

(*) Notice: Subject to any disclaimer, the term of this patent is extended or adjusted under 35 U.S.C. 154(b) by 307 days.

(21) Appl. No.: 17/852,904

(22) Filed: Jun. 29, 2022

(65) Prior Publication Data

US 2024/0001853 A1      Jan. 4, 2024

(51) Int. Cl.
*B60R 3/02* (2006.01)
*B60R 3/00* (2006.01)

(52) U.S. Cl.
CPC .................................. *B60R 3/007* (2013.01)

(58) Field of Classification Search
CPC .............. B60R 7/007; B60R 7/02; B60R 7/00
See application file for complete search history.

(56) References Cited

U.S. PATENT DOCUMENTS

| | | | | |
|---|---|---|---|---|
| 5,560,666 A | * | 10/1996 | Vieira ...................... | B60P 3/40 410/116 |
| 6,003,633 A | * | 12/1999 | Rolson ..................... | E06C 5/02 182/127 |
| 10,549,697 B2 | * | 2/2020 | Rolson ..................... | E06C 5/04 |
| 2021/0309155 A1 | | 10/2021 | Rolson | |

* cited by examiner

*Primary Examiner* — John D Walters

(57) ABSTRACT

A trailer mountable portable ladder assembly includes a base plate having an upper surface and a lower surface. A post is attached to and extends downwardly from the lower surface and is sized to be removably extended into a stake pocket. A fastening member is mechanically mounted in the post. The fastening member is actuated to frictionally engage an inner surface of the stake pocket to releasably retain the post in the stake pocket. A ladder is attached to the base plate.

18 Claims, 12 Drawing Sheets

TRAILER MOUNTABLE PORTABLE LADDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to portable ladder device and more particularly pertains to a new portable ladder device to facilitate climbing onto a trailer and which can effectively and efficiently engage stake pockets of a trailer. More particularly, a fastening assembly is utilized which can allow for attachment not only to stake pockets of a trailer, but also to trailers having differing types of attachment points and in particular openings that are most often used for chains.

(2) Description of Related Art Including Information Disclosed Under 37 CFR 1.97 and 1.98

The prior art relates to portable ladder devices and more particularly ladders that can be attached to trailers. These devices utilize different means of engaging a trailer but which are cumbersome and not easily retrofitted to differing sizes of stake pockets.

BRIEF SUMMARY OF THE INVENTION

An embodiment of the disclosure meets the needs presented above by generally comprising a base plate having an upper surface and a lower surface. A post is attached to and extends downwardly from the lower surface and is sized to be removably extended into the stake pocket. A fastening member is mechanically mounted in the post. The fastening member is actuated to frictionally engage an inner surface of the stake pocket to releasably retain the post in the stake pocket. A ladder is attached to the base plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
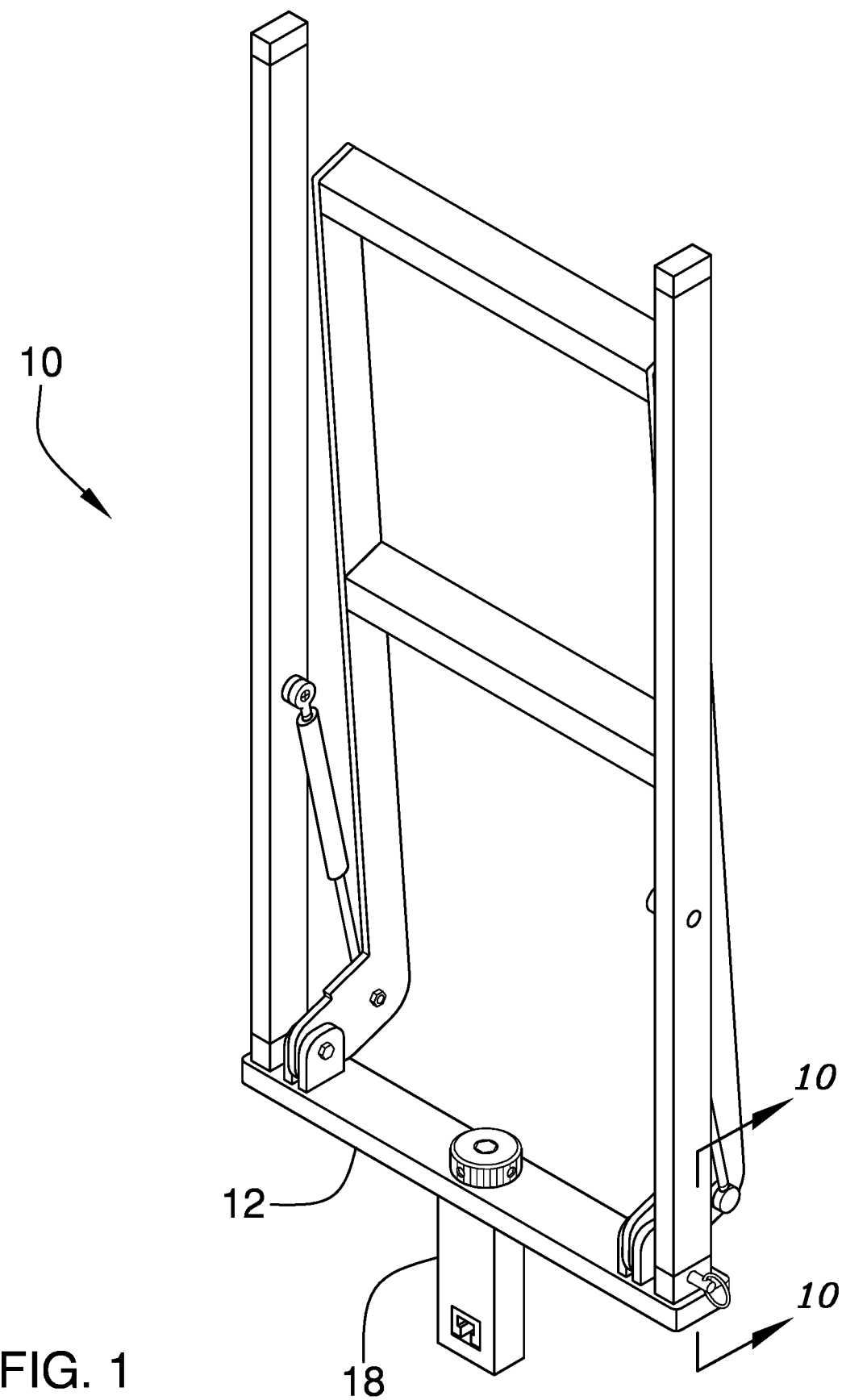
FIG. 1 is a front isometric view of a trailer mountable portable ladder assembly according to an embodiment of the disclosure.
Figure 2:
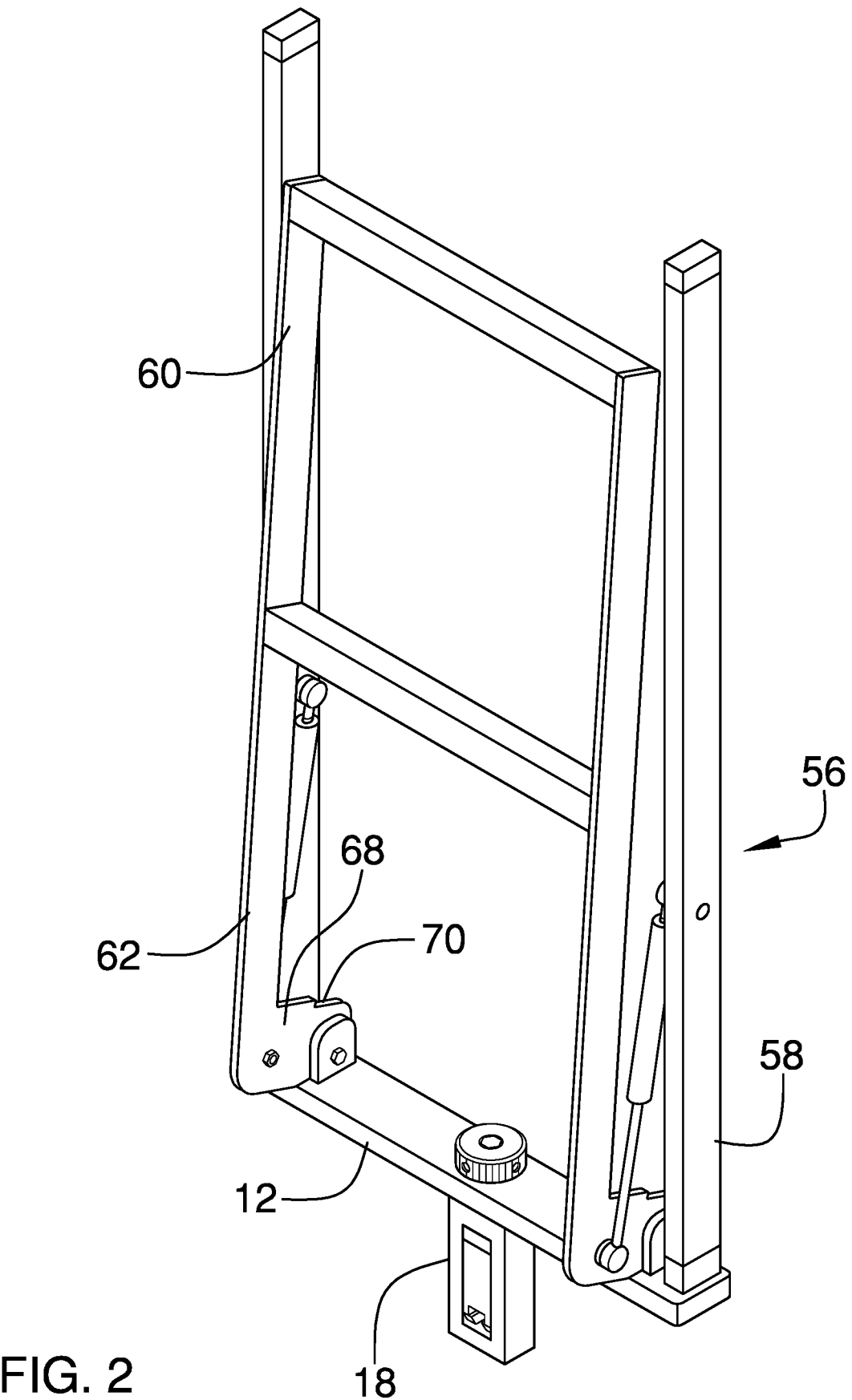
FIG. 2 is a rear isometric view of an embodiment of the disclosure.

With reference now to the drawings, and in particular to FIGS. 1 through 12 thereof, a new portable ladder device embodying the principles and concepts of an embodiment of the disclosure and generally designated by the reference numeral 10 will be described.

As best illustrated in FIGS. 1 through 12, the trailer mountable portable ladder assembly 10 generally comprises a base plate 12 having an upper surface 14 and a lower surface 16. A post 18 is attached to and extends downwardly from the lower surface 16. The post 18 is sized to be removably extended into a stake pocket 20. The stake pocket 20, or stake pockets, are conventionally found in a trailer 22 of tractor trailers or beds of trucks. These stake pockets 20 are used as mounting areas for barriers used in containment of articles positioned on the trailer. The post 18 is most typically rectangularly shaped and has a height from about 4.0 inches to about 8.0 inches, though these may be altered depending on the stake pocket 20. Though not shown, the post 18 may include a lock aperture therein for allowing a person to extend a padlock, chain, cable or other locking device through the post 18 after it engages the stake pocket 20 to prevent theft of the assembly 10.

Figure 8:
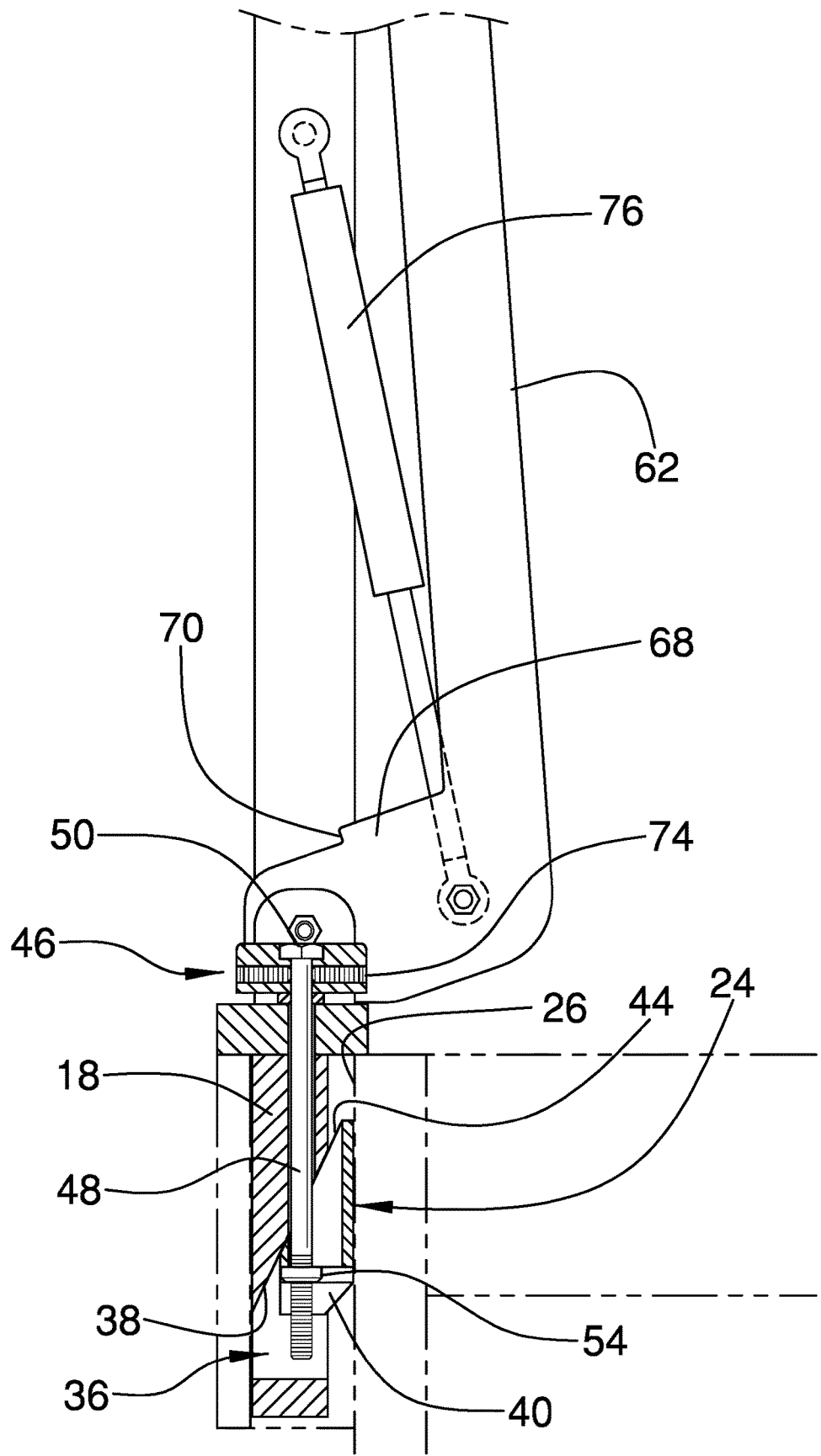
FIG. 8 is a cross-sectional view of an embodiment of the disclosure taken along line 8-8 of FIG. 7.

A fastening member 24 is mechanically mounted in the post 18. As shown in FIG. 8, the fastening member 24 is actuated to frictionally engage an inner surface 26 of the stake pocket 20 to releasably retain the post 18 in the stake pocket 20.

Figure 6:
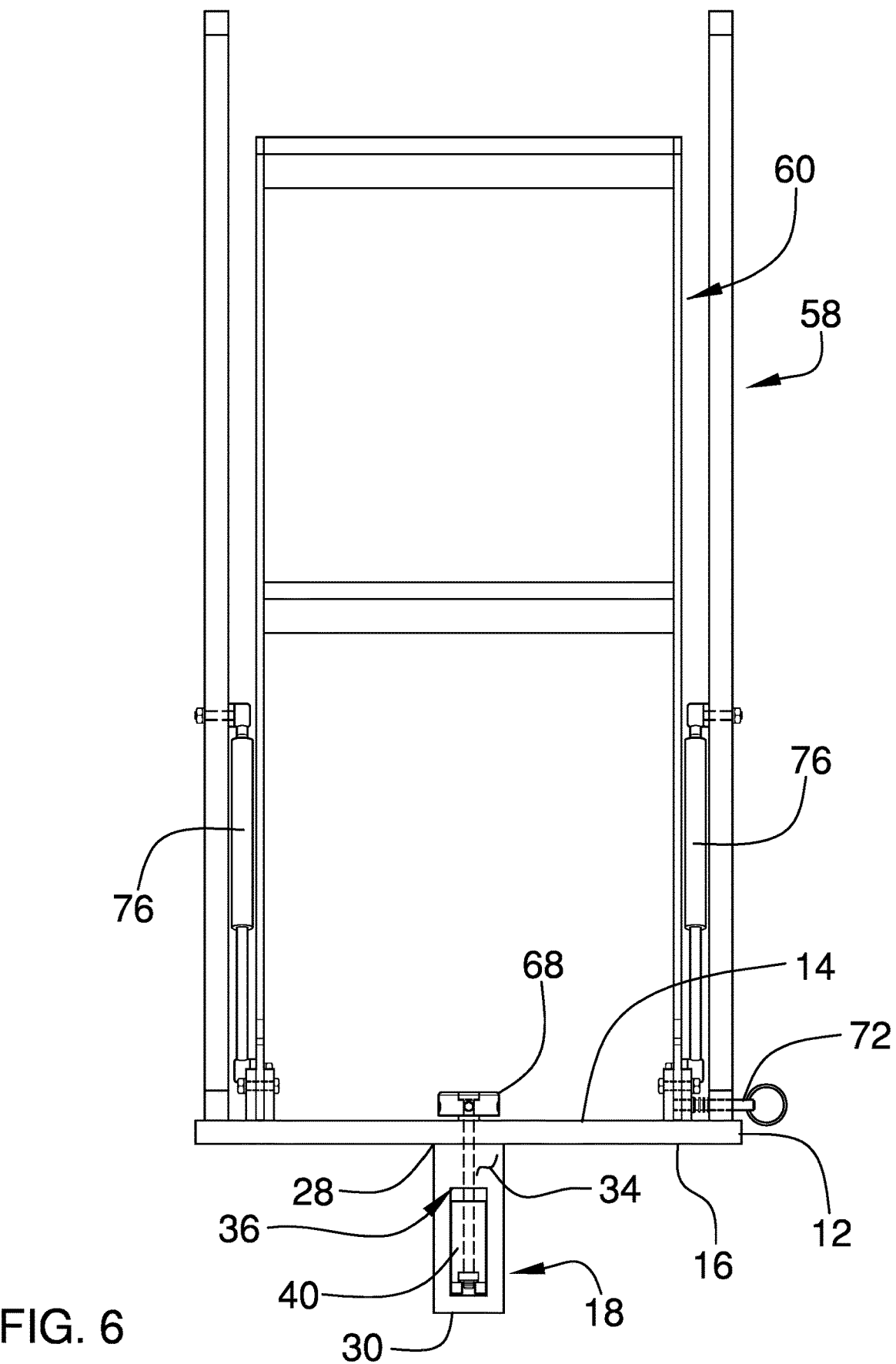
FIG. 6 is a rear view of an embodiment of the disclosure.
Figure 7:
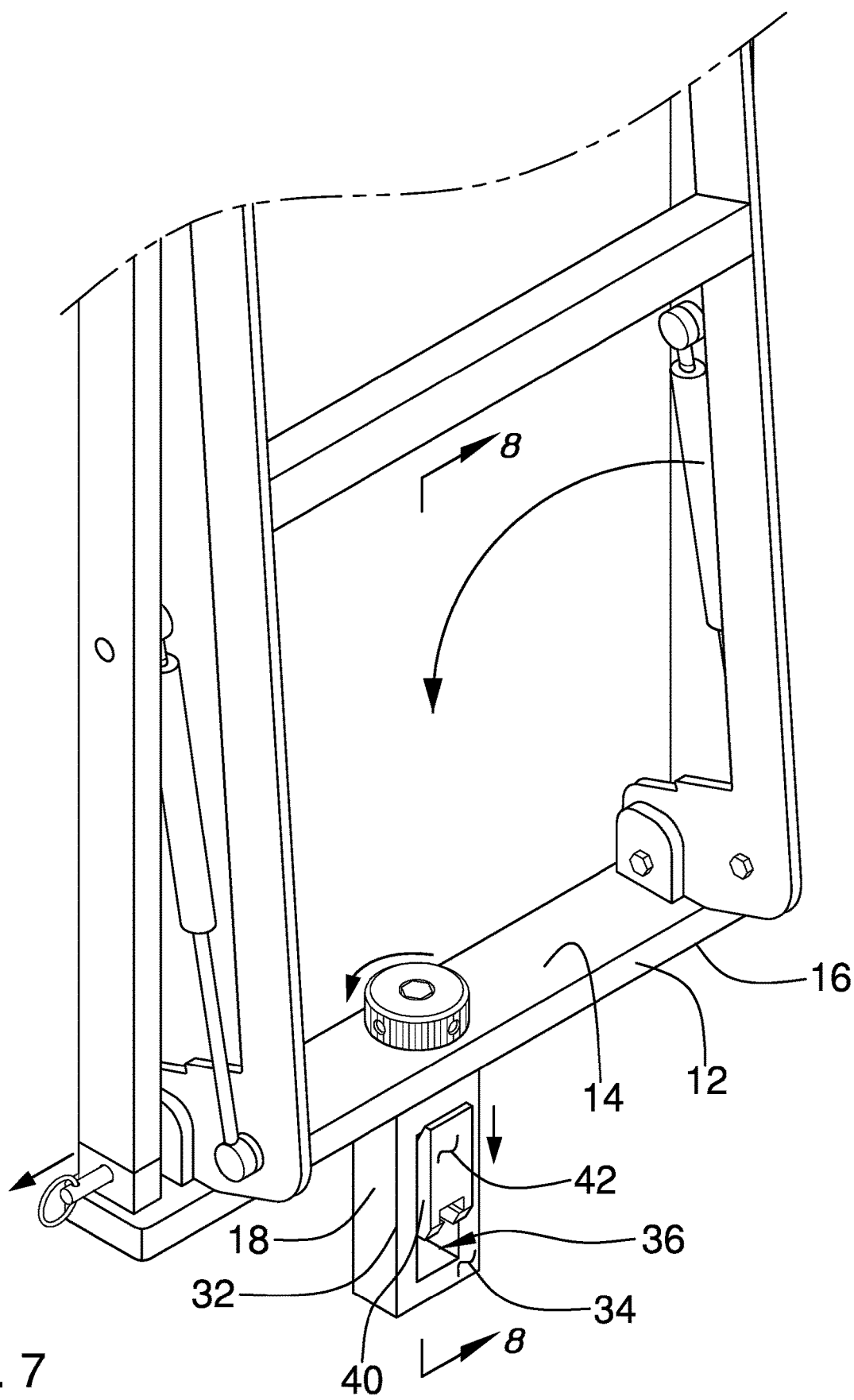
FIG. 7 is a rear isometric view of an embodiment of the disclosure.

In one embodiment as shown in FIGS. 6 through 8, the post 18 has an upper end 28 attached to the lower surface 16 and a lower end 30 positioned opposite of the upper end 28. A perimeter surface 32 extends between the upper 28 and lower 30 ends. The perimeter surface has a first side 34, which typically is a rear facing side of the post 18 when mounted in the stake pocket 20, having a well 36 extending therein. The well 36 may have top wall 38 that is angled upwardly as the top wall 38 travels toward and abuts the first side 34.

In this embodiment, the fastening member 24 includes a block 40 positioned in the well 36. The block 40 has an exterior side 42 facing outwardly of the well 36 in the first side 34. The block 40 has an upper edge 44 that is angled such that the upper edge 44 lies in a plane which is co-planar with the top wall 38 of the well 36. An actuator 46 of the fastening member 24 is actuated to move the block 40 into or outwardly from the well 36. The actuator 46 includes a threaded rod 48 to engage the block 40. The block 40 is moved upwardly against the top wall 38 and moves outwardly of the well 36 to abut the inner surface 26 of the stake pocket 20 when the threaded rod 48 is rotated in a first direction. The friction between the block 40 and inner surface 60 retains the post in the stake pocket 20. The block 40 moves downwardly and retreats into the well 38 and disengages the inner surface 26 when the threaded rod 48 is rotated in a second direction.

In some trailers, a stake pocket 20 is not utilized and instead holes, typically for receiving and engaging chains and therefore called keyhole chain slots, vertically extend through the trailer along its edge. This portion of the trailer is typically a plate. The fastening member 24 will also function with such structures. For these types of trailers, the post 18 is extended through the keyholes such that the base plate 12 rests on the trailer and covers the keyholes. The block 40 is then actuated in substantially the same way as with the stake pocket 20, but instead of frictionally engaging the interior of a stake pocket, a juncture of the exterior side 42 and upper edge 44 abuts an underside of the trailer. As the block 40 is moved upwardly the base plate 12 is pulled downwardly to retain the trailer between the block and the base plate 12.

A head 50 is attached to the threaded rod 48 to facilitate rotation of the threaded rod 48. In one embodiment, the head 50 is positioned above the base plate 12 and may additionally include or comprise a handle 52 that is easily gripped and manipulated by a person without a tool. In other embodiments, the head 50 may be countersunk into the base plate 12 or into the stake 18 and thereafter engageable with a hand tool extendable into or through the base plate 12.

Figure 9:
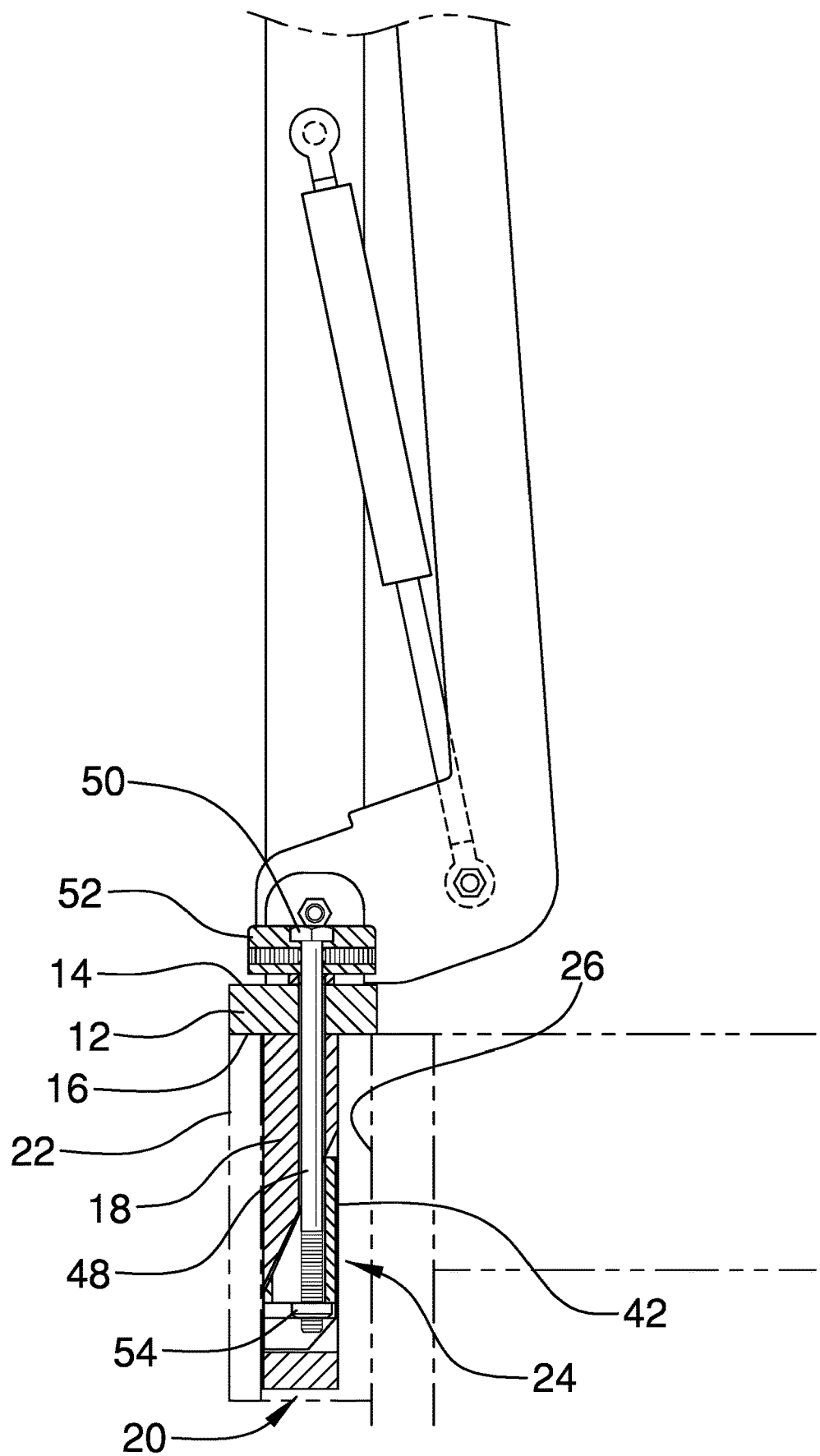
FIG. 9 is a cross-sectional view of an embodiment of the disclosure.
Figure 10:
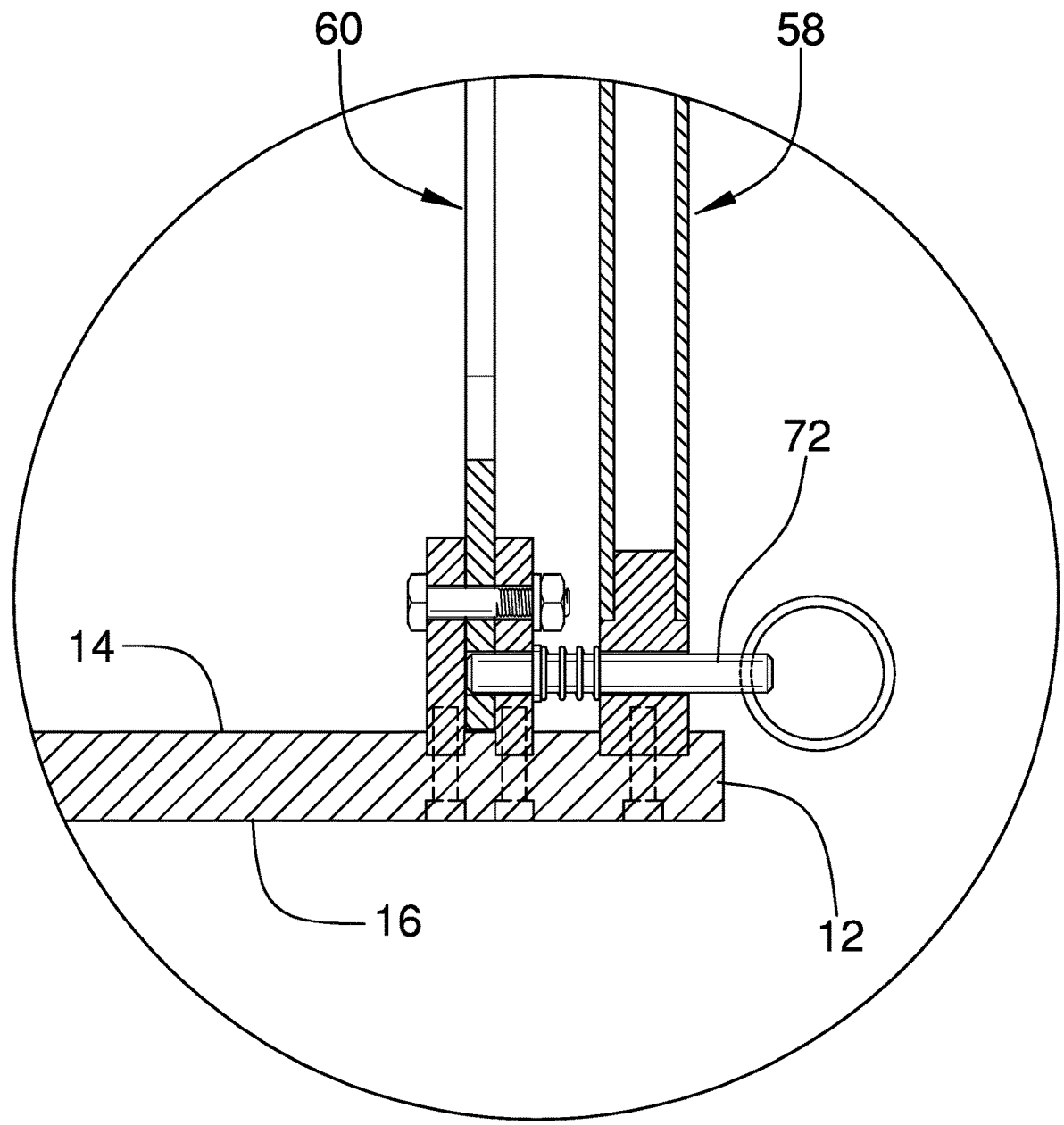
FIG. 10 is a cross-sectional view of an embodiment of the disclosure taken along line 10-10 of FIG. 1.
Figure 11:
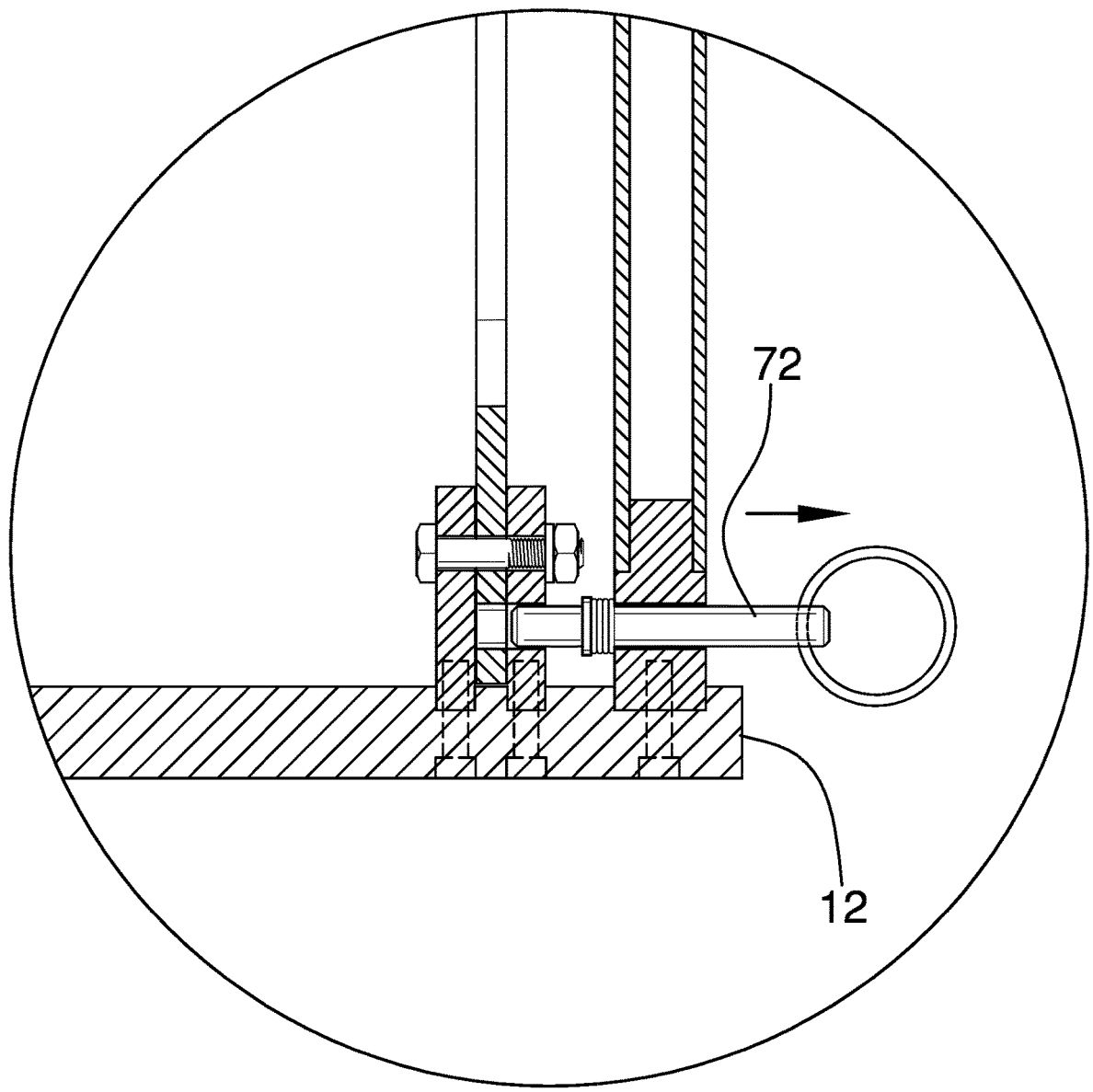
FIG. 11 is a cross-sectional view of an embodiment of the disclosure.
Figure 12:
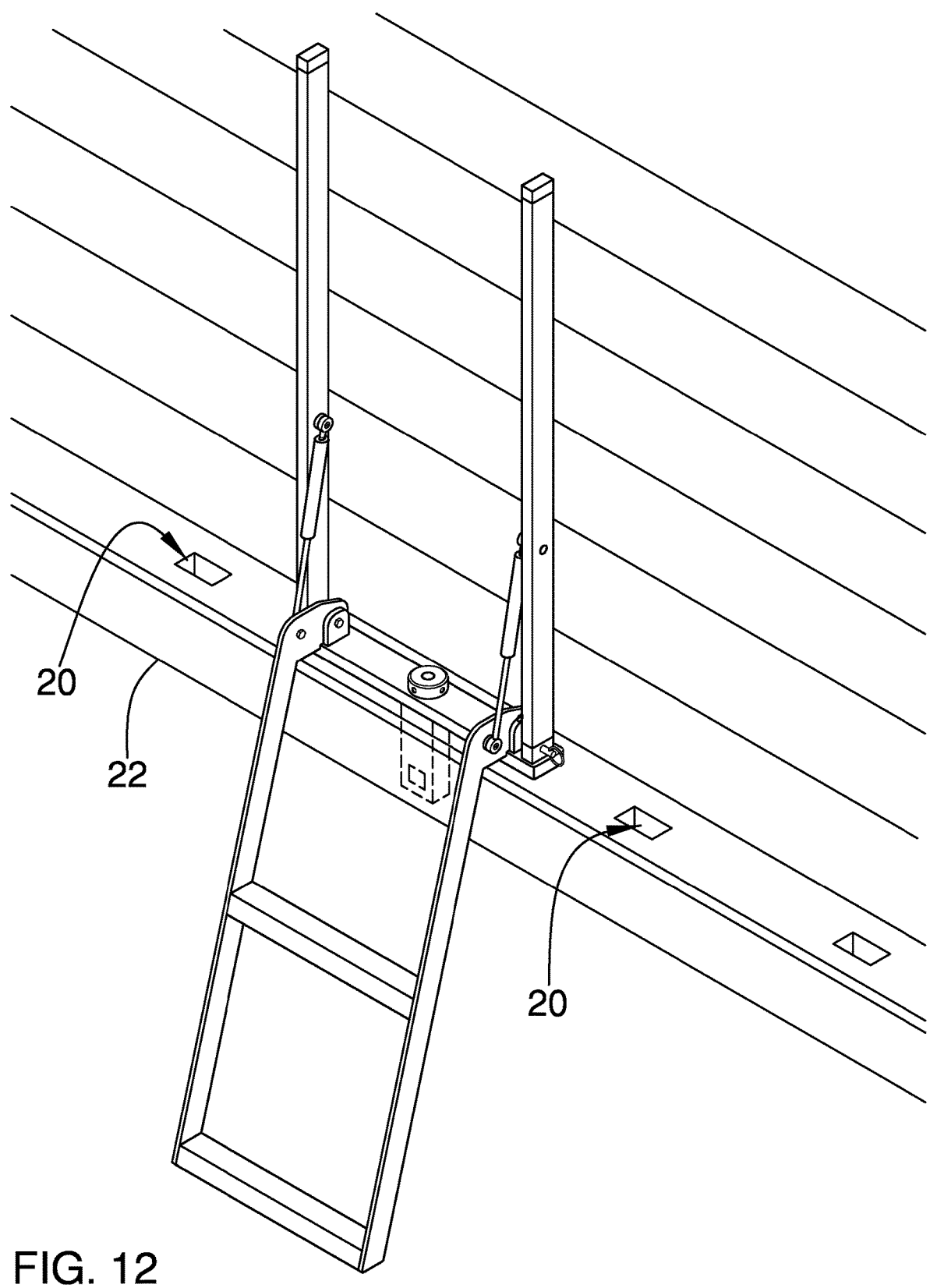
FIG. 12 is a front isometric in-use view of an embodiment of the disclosure.

As can be seen in the FIGS. 8 and 9, the threaded rod 48 extends through an opening in the post 40 extending into the well 36 to engage the block 40. The block 40 includes a stop 54 slidably movable forward and rearward within the block 4 but which is restricted from vertical movement. The threaded rod 48 is threadably coupled to the stop 54 wherein the stop 54 is pulled upwardly with the block 40 when the threaded rod 48 is rotated in the first direction and pushed downwardly with the block 40 when the threaded rod 48 is rotated in the second direction. Since the stop 54 moves within the block 40, the threaded rod 48 remains substantially vertically orientated as the block 40 moves forward and backward relative to the post 18. The stop 54 may be any shape and thus can include shapes including being disc-shaped and any slidable member that is threadably coupled to the threaded rod 48 may work.

It should be understood that the angles of the top wall 38 and upper edge 44 may be reversed such that the block 40 moves outwardly from the well 36 as the block 40 moves downwardly with respect to the base plate 12. It should further be understood that alternate actuators 46 may be utilized including collet type assemblies, ratcheting mechanisms, and the like. However, the embodiment generally depicted in the Figures is easily constructed while including few failure points and therefore may be a preferred construction.

Figure 3:
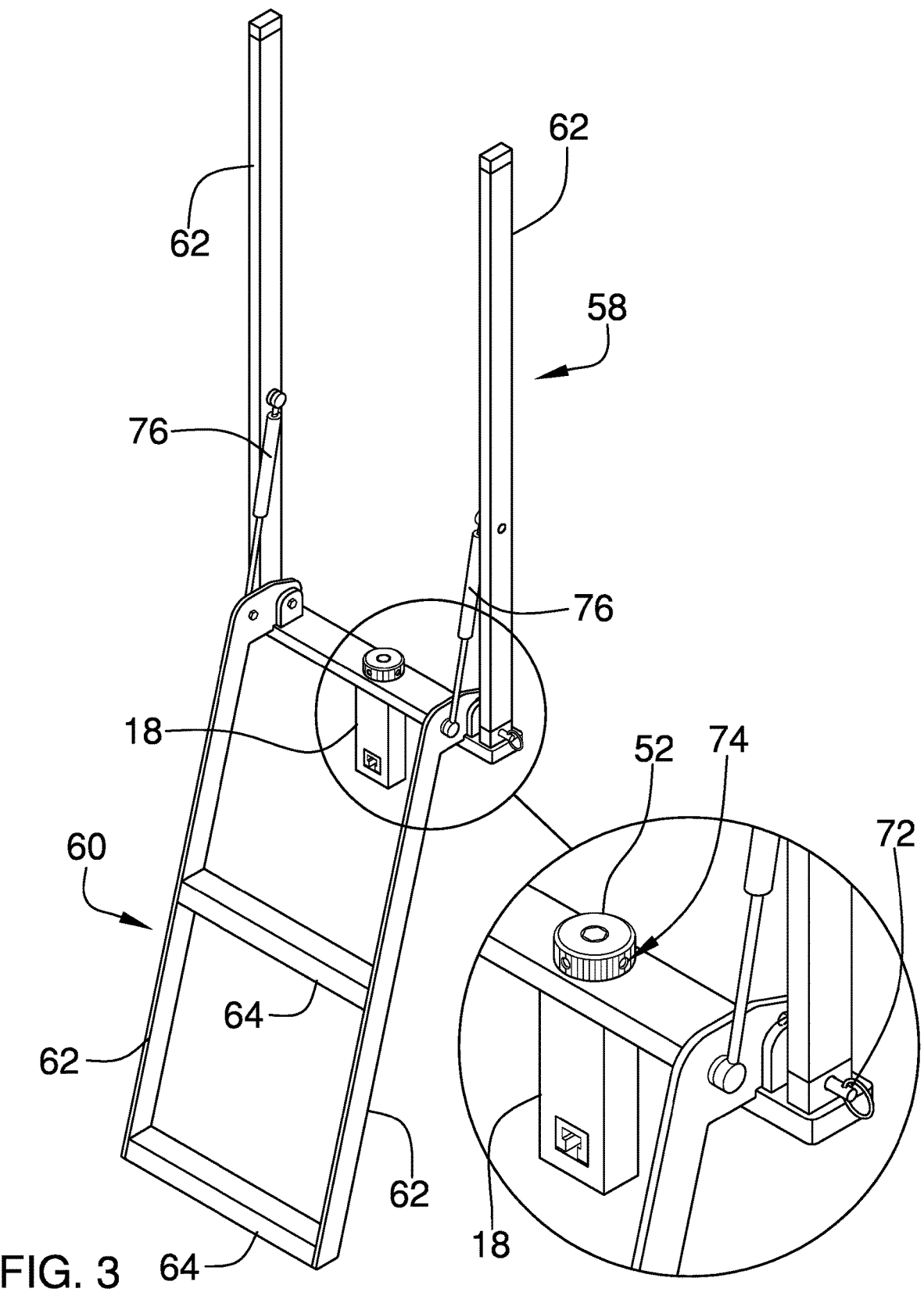
FIG. 3 is a front view of an embodiment of the disclosure.
Figure 4:
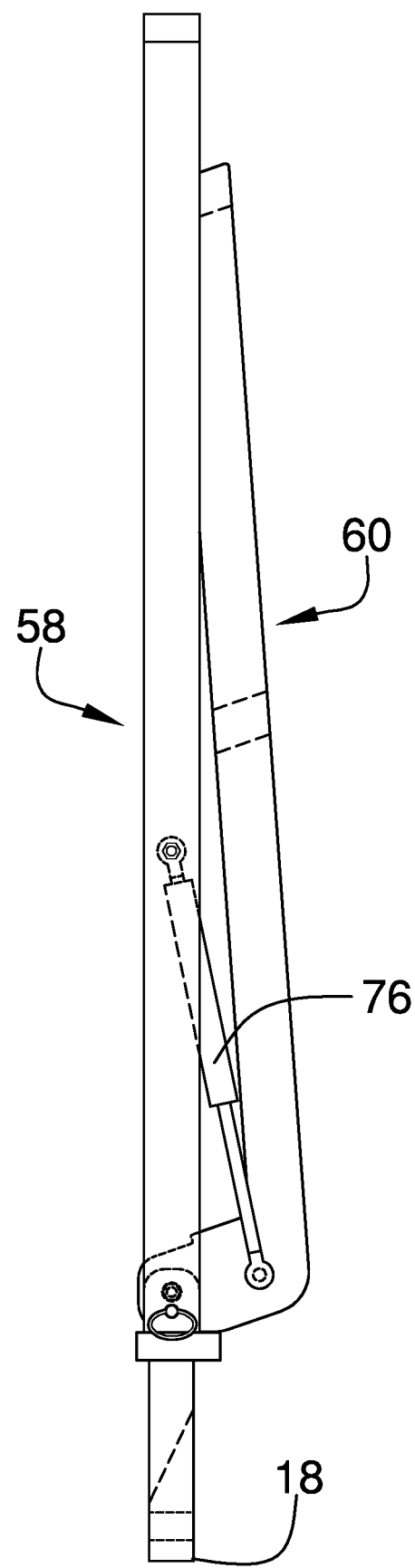
FIG. 4 is a side view of an embodiment of the disclosure.
Figure 5:
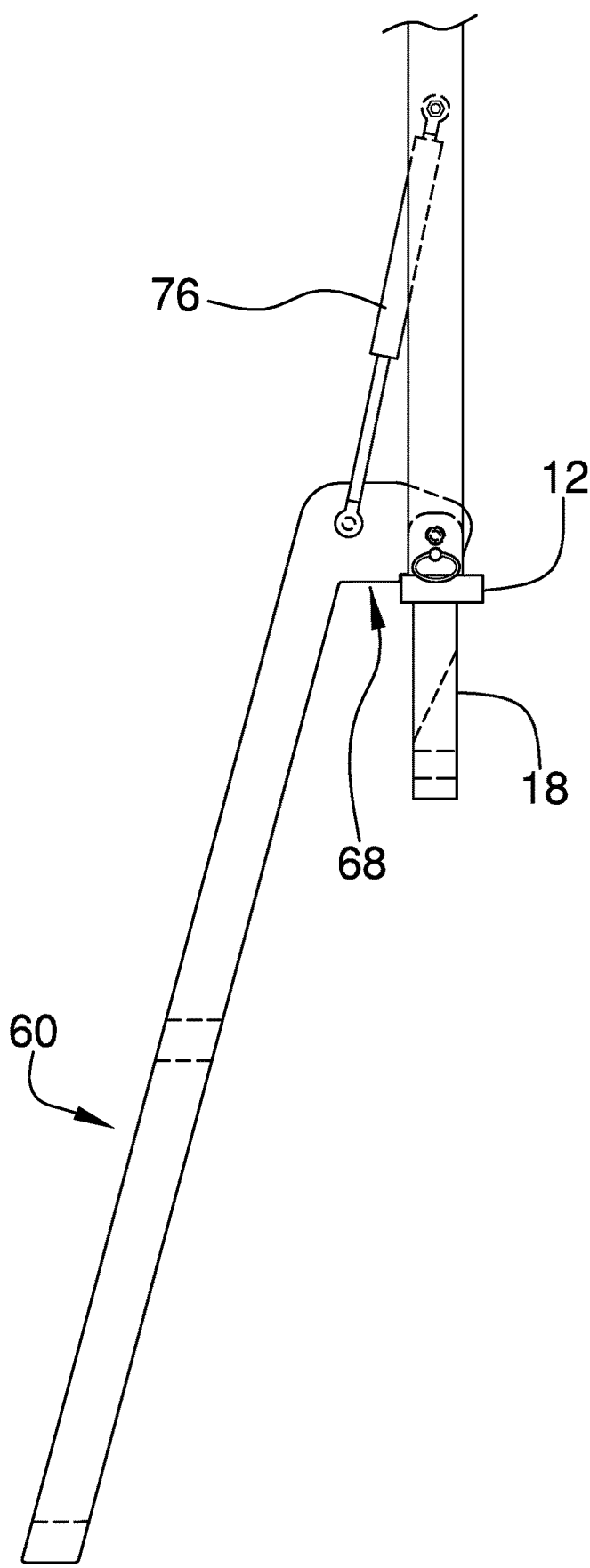
FIG. 5 is a partial side view of an embodiment of the disclosure.

A ladder 56 is attached to the base plate 12 and is used assisting a person to climb up onto the trailer 22. The ladder 56 of the current embodiment comprises an upper section 58 that is attached to the upper surface 14 and extends upwardly therefrom. The upper section 58 is fixed in a vertical orientation. A lower section 60 is attached to the upper section 58 either directly to the upper section 58 or by connection to the base plate 12. The lower section 60 is pivotable between a stored position extending upwardly from the base plate 12 as shown in FIG. 1 and a deployed position extending downwardly from the base plate as shown in FIG. 3. An angle between the lower section 60 and the upper section 58 is typically from 145° to 175° when the lower section 60 is in the deployed position.

As can be seen in Figures, each of the upper 58 and lower sections 60 includes a pair of side rails 62 though rungs 64 may only be positioned on the lower section 60 while the side rails of the upper section 60 are used as gripping points while climbing the lower section 60. The rungs 64 on the lower section 60 may have a top side being angled to offset the angle of the lower section 60 such that the top sides of the rungs 64 are substantially horizontal when the lower section 60 is deployed. While rungs 64 may be positioned on the upper section 58, the absence of rungs 64 will allow a user to more easily travel onto the trailer 22 by stepping through the side rails 62 of the upper section 58. The side rails 62 of the of the lower section 60 each includes an offset section 68 to allow the lower section 60 to carry over an edge of the trailer 22 when in the deployed position. A notch 70 in the offset section 68 engages an outer edge of the base plate 12 to stabilize the lower section 60 relative to the base plate 12 when the lower section 60 is in the deployed position. When the lower section 60 is in the stored position, a pin 72 is removably extendable into the lower section 60 to releasably lock the lower section 60 in the stored position. The pin 72 may additionally extend through the upper section 58. As can be seen in the Figures, the handle 52 may include one or more apertures 74. Though the pin 72 is depicted as being retained in place and biased into the lower section 60 with a spring, the pin 72 may instead be removable to be inserted into one of the apertures 74 to provide leverage for the user 52 of the assembly to rotate the handle 52.

A resistance member 76 is attached to and extends between the upper 58 and lower 60 sections. The resistance member 76 resists the lower section 60 from free falling and to slow a transition of the lower section 60 from the stored position to the deployed position. In one embodiment, the resistance member 76 comprises a conventional gas spring. Because of the offset in the lower section 60, which is due to trailer having what is known as a roller track and therefore the lower section 60 requiring clearance over the roller track, the lower section center of gravity is moved outwardly from the base plate 12. The lower section 60 therefore is slightly tilted inwardly over the base plate in the stored position and can easily pivot outward or inward when vertically orientated. The resistance member 76 is attached to the offset area of the lower section 60 and thus must retract first before then expanding again as it moves from the stored position to the deployed position. The reverse happens when moving to the stored position where after contracting in length, the resistance member elongates again before achieving the stored position. Thus, the resistance member 76 may also act as an auto-retracting device when the lower section 60 is partially returned to the stored position. That is, as the lower section 60 moves from the deployed position to the stored position, the resistance 76 member will assist or may completely take over a part of the lower section 60 movement to the stored position. This part of the "storage movement" movement is typically between 20% and 50% of the lower section 60 movement from the deployed position to the stored position. Aside from facilitating the movement into the stored position, this also helps to retain the lower section 60 in the stored position.

In use, when a user of the assembly 10 would like to access an upper side of the trailer 22, the user extends the post 18 into one of the stake pockets 20. The fastening member 24 is actuated to cause the block 40 to frictionally engage the stake pocket 20. This will stabilize the base plate 12 relative to the trailer. The lower section 60 is then pivoted downwardly from the base plate 12 to allow the user to climb up the lower section 60 and step onto the trailer while gripping the upper section 58.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable ladder assembly for releasably engaging a truck or trailer having a stake pocket, the assembly including:
    a base plate having an upper surface and a lower surface;
    a post being attached to and extending downwardly from the lower surface, the post being sized to be removably extended into the stake pocket;
    a fastening member being mechanically mounted in the post, the fastening member being actuated to frictionally engage an inner surface of the stake pocket to releasably retain the post in the stake pocket;
    a ladder being attached to the base plate;
    wherein the post has an upper end attached to the lower surface and a lower end positioned opposite of the upper end, a perimeter surface extending between the upper and lower ends, the perimeter surface having a first side having a well extending therein; and
    wherein the fastening member including a block being positioned in the well, the block having an exterior side facing outwardly of the well in the first side, the block being movable outwardly of the well such that the exterior side abuts and frictionally engages the inner surface of the stake pocket.

2. The portable ladder assembly according to claim 1, further including an actuator being mechanically coupled to the block to selectively move the block outwardly from or inwardly to the well.

3. The portable ladder assembly according to claim 2, wherein the well has top wall being angled upwardly as the top wall travels toward and abuts the first side, the block having an upper edge being angled such that the upper edge lies in a plane being co-planar with the top wall of the well, the block being moved upwardly against the top wall and moving outwardly of the well to abut the inner surface of the stake pocket when the actuator is actuated in a first direction, the block moving downwardly and retreating into the well when the actuator actuated in a second direction.

4. The portable ladder assembly according to claim 3, wherein the actuator includes a threaded rod engaging the post and the block, a head being attached to the threaded rod to facilitate rotation of the threaded rod, the head being positioned above the base plate.

5. The portable ladder assembly according to claim 2, wherein the ladder comprising:
    an upper section being attached to the upper surface and extending upwardly therefrom, the upper section being fixed in a vertical orientation; and
    a lower section being attached to the upper section, the lower section being pivotable between a stored position extending upwardly from the base plate and a deployed position extending downwardly from the base plate.

6. The portable ladder assembly according to claim 5, wherein an angle between the lower section and the upper section being from 145° to 175° when the lower section is in the deployed position.

7. The portable ladder assembly according to claim 6, further including a resistance member being attached to and extending between the upper and lower sections, the resistance member resisting the lower section free falling to slow a transition of the lower section from the stored position to the deployed position.

8. The portable ladder assembly according to claim 7, further including a pin being removably extendable into the lower section to releasably lock the lower section in the stored position.

9. The portable ladder assembly according to claim 7, wherein the well has top wall being angled upwardly as the top wall travels toward and abuts the first side, the block having an upper edge being angled such that the upper edge lies in a plane being co-planar with the top wall of the well, the block being moved upwardly against the top wall and moving outwardly of the well to abut the inner surface of the stake pocket when the actuator is actuated in a first direction, the block moving downwardly and retreating into the well when the actuator actuated in a second direction.

10. The portable ladder assembly according to claim 9, wherein the actuator includes a threaded rod engaging the post and the block, a head being attached to the threaded rod to facilitate rotation of the threaded rod, the head being positioned above the base plate.

11. The portable ladder assembly according to claim 5, further including a pin being removably extendable into the lower section to releasably lock the lower section in the stored position.

12. The portable ladder assembly according to claim 11, wherein the pin extends through the upper section.

13. The portable ladder assembly according to claim 5, further including a resistance member being attached to and extending between the upper and lower sections, the resistance member resisting the lower section free falling to slow a transition of the lower section from the stored position to the deployed position.

14. The portable ladder assembly according to claim 1, wherein the ladder comprising:
   an upper section being attached to the upper surface and extending upwardly therefrom, the upper section being fixed in a vertical orientation; and
   a lower section being attached to the upper section, the lower section being pivotable between a stored position extending upwardly from the base plate and a deployed position extending downwardly from the base plate.

15. The portable ladder assembly according to claim 14, wherein an angle between the lower section and the upper section being from 145° to 175° when the lower section is in the deployed position.

16. The portable ladder assembly according to claim 14, further including a pin being removably extendable into the lower section to releasably lock the lower section in the stored position.

17. The portable ladder assembly according to claim 16, wherein the pin extends through the upper section.

18. The portable ladder assembly according to claim 14, further including a resistance member being attached to and extending between the upper and lower sections, the resistance member resisting the lower section free falling to slow a transition of the lower section from the stored position to the deployed position.

\* \* \* \* \*